May 27, 1958  T. I. ROBINSON  2,836,150
LIVESTOCK FEEDER

Filed March 18, 1957  2 Sheets-Sheet 1

Thomas I. Robinson
INVENTOR.

BY
*Attorneys*

May 27, 1958    T. I. ROBINSON    2,836,150
LIVESTOCK FEEDER

Filed March 18, 1957    2 Sheets-Sheet 2

Thomas I. Robinson
INVENTOR.

United States Patent Office 2,836,150
Patented May 27, 1958

2,836,150

LIVESTOCK FEEDER

Thomas I. Robinson, Levelland, Tex., assignor of one-fourth to Thomas N. Robinson and one-fourth to Dayton B. Robertson, both of Levelland, Tex.

Application March 18, 1957, Serial No. 646,614

1 Claim. (Cl. 119—53)

My invention relates to improvement in livestock feeders for feeding hogs, sheep and cattle especially.

The primary object of my invention is to provide in a feeder embodying a food container for a mass of hog, sheep or cattle feed, means whereby the hogs or cattle may feed from a constantly replenished supply of food at the bottom of the container while being prevented from throwing the food out of the container by nosing or rooting and thereby wasting the food.

Other objects are to provide self-closing doors for the container adapted to be opened inwardly by the hogs, sheep or cattle seeking food and adjustable baffles in the container for variably limiting the supply accessible to the hogs, sheep or cattle and preventing the food in the container from interfering with opening of the doors.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

Figure 1:
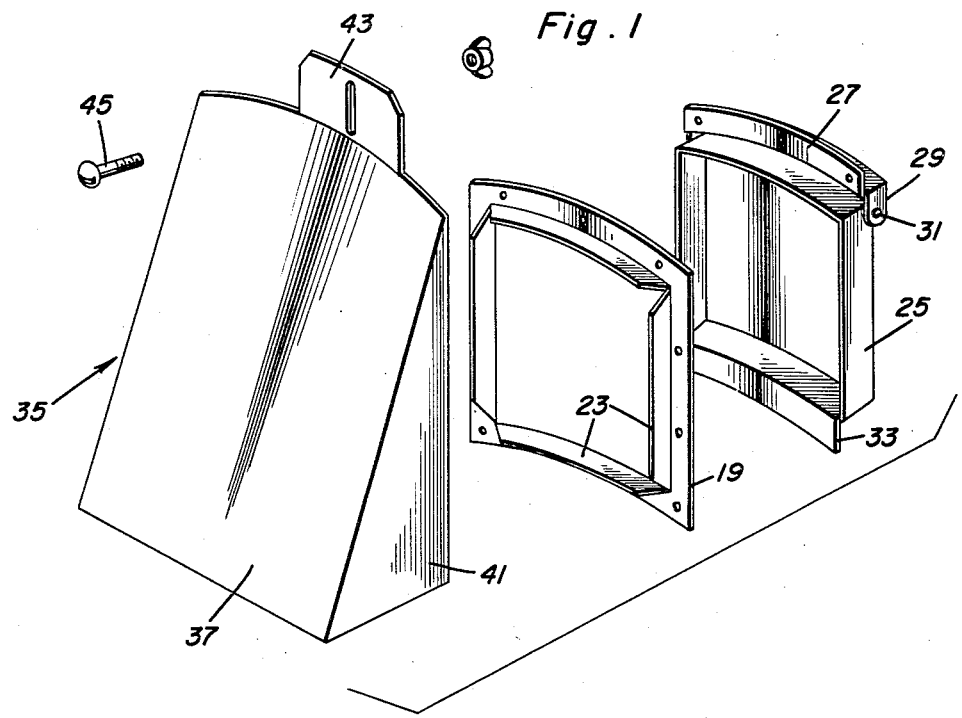
Figure 1 is an exploded view in perspective of one of the doors, a frame therefor, and one of the baffles together with means for adjusting the baffle.
Figure 2:
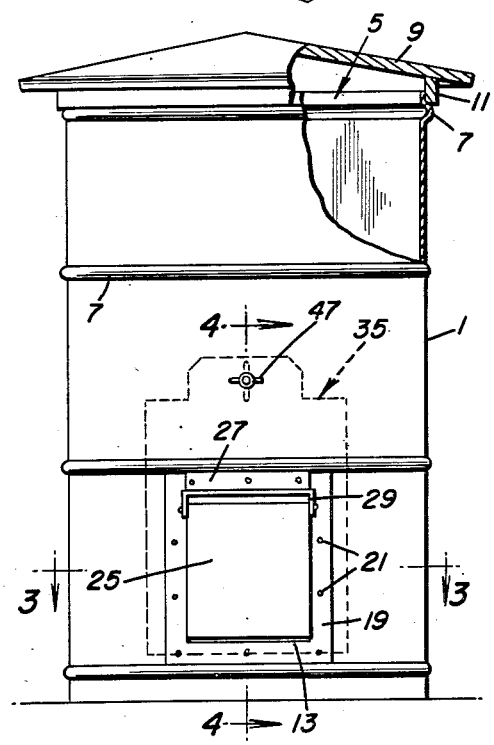
Figure 2 is a view in side elevation on a smaller scale of the feeder partly broken away and shown in section.
Figure 3:
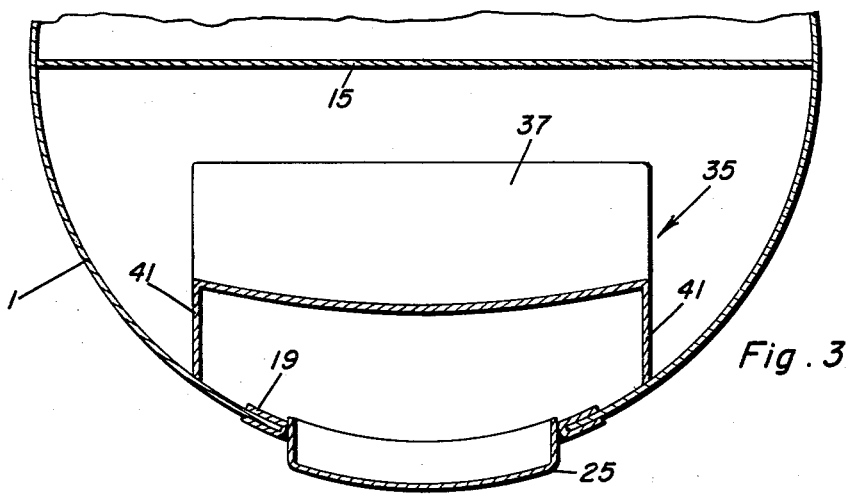
Figure 3 is a fragmentary enlarged view in horizontal section taken on the line 3—3 of Figure 2.

Referring to the drawings by numerals, the feeder of my invention comprises an upright food container 1 having a flat bottom 3, and an open top 5, and which, preferably, although not necessarily, is a commercial petroleum barrel with the usual vertically spaced circumferential reinforcing beads 7.

A conical cover 9 is provided for closing the upper end of the container 1 and which overhangs the container and includes a depending skirt 11 seating on the uppermost bead 7 of said container 1.

A pair of rectangular doorway openings 13 are formed in diametrically opposite sides of the container 1 above the bottom 3, and a vertical diametrical partition 15 is provided in the container 1 dividing the same into a pair of compartments 17 with a doorway opening 13 for each compartment.

A pair of rectangular door frames 19 of flat metal conforming in curvature to the container 1 surround the openings 13 exteriorly of the container 1 and are riveted, as at 21, to the container 1 and provided with inner edge flanges 23 overlapping the container 1 around the openings 13 for reinforcing purposes.

Figure 4:
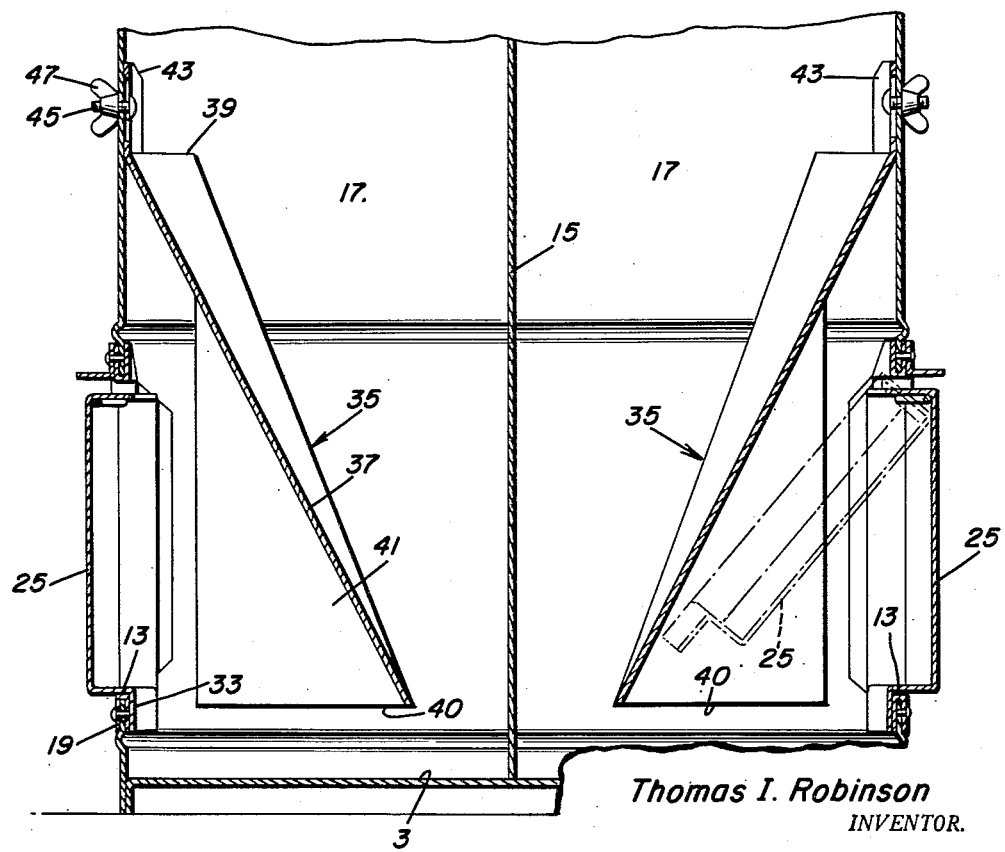
Figure 4 is a fragmentary enlarged view in vertical section taken on the line 4—4 of Figure 2.

Inwardly and upwardly opening doors 25 are provided for swinging into and out of the door frames 19, as shown in full and dotted lines in Figure 4, and which are of rectangular box type with open sides facing inwardly to fit in the door frames 19 when closed and projecting outwardly thereof so that livestock may find the same in attempting to gain access to food in the container 1.

The doors 25 are swingably mounted by means of angle hanger bars 27 extending horizontally along the tops of the frames 9 in front thereof and secured thereto by some of the rivets 21, the hanger bars 27 each being provided with a pair of depending end ears 29 between which the doors 25 are pivoted by a pintle rod 31 extending through the sides of the doors at the upper ends of said doors, or the tops thereof. A depending flange 33 on the lower end or bottom of each door 25 engages the lower end of the associated frame 19 whereby the doors 25 are prevented from opening outwardly.

A pair of vertically elongated upright baffles 35 are provided in the compartments 17 opposite the doors 19 for diverting food in the compartments 17 away from the doors 19 and permitting a limited, variable supply of food to accumulate under the baffles within reach of hogs or cattle opening the doors 25. For this purpose, the baffles 35 comprise rectangular plates 37 inclining downwardly from opposite sides of the container 1 toward the partition 15, which is to sway away from the doors 25, and which are spaced from the bottom 3 of the container 1, said plates 37 being arcuate at their upper ends 39 to conformably fit the sides of the container 1 above the doors 25 and being provided with vertical side edge flanges 41 of triangular shape to fit against the side of the container 1 at opposite sides of the doors 25. As will be seen, the baffles 35 are substantially channel members. The baffles 35 are vertically adjustably suspended from the side of the container 1 to variably space the lower ends 40 thereof from the bottom 3 to selectively predetermine the amount of food supply that can accumulate under the same opposite the doors 25. For this purpose, vertically slotted tabs 43 are provided on the upper ends 39 of the baffles 35 and bolts 45 extend through the slotted tabs and out of the side of the container 1 and are provided with wing nuts 47 thereon outside of said container 1.

The operation of my invention will be readily understood. Food in the compartments 17 such as grain, ear corn, or any other suitable food settles in the container 1 and is prevented from blocking opening of the doors 25 while food may accumulate on the bottom 3 under the lower ends 40 of said baffles between the baffles and the doors 25 in limited supply amounts established by the spacing of the baffles 35 above the bottom 3 of the container 1, and this spacing may be varied selectively by vertical adjustment of the baffles 35 so that a predetermined supply of food is available to hogs or cattle pushing the doors 25 open into the baffles between the flanges 41 thereof. As will be seen, the doors 25 when released will gravitate into closed position. The door openings 31 are above the bottom 3 to prevent food from escaping out of the container 1 at the doors by nosing or rooting of hogs or cattle during feeding. The hanger bars 27 overhang the upper ends or tops of the doors 25 to prevent rain or snow from entering the compartments 17 at the tops of the doors 25. The partition 15, as will be clear provides separate compartments for different types of food.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

A gravity feed livestock feeder having a vertical cylindrical wall and a bottom, a pair of doors at opposite sides of the wall above said bottom hingedly suspended from the wall for opening inwardly, a pair of baffles in said feeder opposite said doors and each comprising a rectangular plate inclining downwardly and inwardly from the wall and having an upper curved end fitting against the wall, said plates having a pair of triangular side flanges fitting against said wall at opposite sides of the doors and acting with said plates to deflect feed away from the doors, said plates and flanges having lower ends equidistantly spaced above said bottom and below the doors to provide for feed accumulating under said lower ends in front of the doors at a level below the doors, and means vertically adjustably suspending the plates from said wall for variably spacing said lower ends from the floor to provide for accumulating feed under said lower ends at different levels and including slotted upright tabs on said upper ends, and fasteners extending through said slotted tabs and securing the same to said wall.

References Cited in the file of this patent

UNITED STATES PATENTS

| | | |
|---|---|---|
| 517,101 | Haigler | Mar. 27, 1894 |
| 1,297,743 | Simmons | Mar. 18, 1919 |
| 1,725,628 | Gerhardt | Aug. 20, 1929 |

UNITED STATES PATENT OFFICE
CERTIFICATE OF CORRECTION

Patent No. 2,836,150

May 27, 1958

Thomas I. Robinson

It is hereby certified that error appears in the above numbered patent requiring correction and that the said Letters Patent should read as corrected below.

In the grant, lines 3, 12 and 13, and in the heading to the printed specification, lines 4 and 5, name of the second assignee, for "Dayton B. Robertson" read -- Dayton B. Robinson --.

Signed and sealed this 12th day of August 1958.

(SEAL)

Attest:

KARL H. AXLINE

Attesting Officer

ROBERT C. WATSON
Commissioner of Patents